(12) United States Patent
Trouboul

(10) Patent No.: US 10,460,145 B2
(45) Date of Patent: Oct. 29, 2019

(54) DEVICE FOR CAPTURING IMPRINTS

(71) Applicant: IDEMIA IDENTITY & SECURITY FRANCE, Issy les Moulineaux (FR)

(72) Inventor: Laurent Trouboul, Issy les Moulineaux (FR)

(73) Assignee: IDEMIA IDENTITY & SECURITY FRANCE, Issy les Moulineaux (FR)

( * ) Notice: Subject to any disclaimer, the term of this patent is extended or adjusted under 35 U.S.C. 154(b) by 0 days.

(21) Appl. No.: 15/972,732

(22) Filed: May 7, 2018

(65) Prior Publication Data
US 2018/0330142 A1    Nov. 15, 2018

(30) Foreign Application Priority Data

May 10, 2017   (FR) .................................... 17 54070

(51) Int. Cl.
*G06K 9/00* (2006.01)
*G06K 9/20* (2006.01)
(Continued)

(52) U.S. Cl.
CPC ...... *G06K 9/00033* (2013.01); *G01B 11/2513* (2013.01); *G06F 17/18* (2013.01);
(Continued)

(58) Field of Classification Search
CPC .......... G06K 9/00013; G06K 9/00087; G06K 9/00006; G06K 2009/00939
(Continued)

(56) References Cited

U.S. PATENT DOCUMENTS

| 5,801,681 A * | 9/1998 | Sayag ..................... G06F 3/021 345/157 |
| 6,433,818 B1 * | 8/2002 | Steinberg ........... G07C 9/00142 348/161 |

(Continued)

FOREIGN PATENT DOCUMENTS

| DE | 10 2010 016109 A1 | 9/2011 |
| FR | 2 927 713 B1 | 8/2011 |

OTHER PUBLICATIONS

Jan. 9, 2018 Search Report issued in French Patent Application No. 1754070.
(Continued)

*Primary Examiner* — Yosef Kassa
(74) *Attorney, Agent, or Firm* — Oliff PLC; R. Brian Drozd

(57) ABSTRACT

A device for capturing imprints of a body part on-the-fly, including a stand which includes a region of free space through which a user may pass a body part. When in this zone, the body part is simultaneously illuminated by a light source that produces a uniform illumination of the body part and a sight-projecting module that projects a sight onto the body part, and an image of the body part thus illuminated is acquired by the image-acquiring module. The capturing device is able to model the variations in light intensity of the projection of the sight on the body part by determining parameters of a preset parametric mathematical model, and generate a synthetic image of said projection on the basis of said model and using parameters determined beforehand. The synthetic image is then subtracted from the acquired image in order to obtain a sight-free image of the body part.

11 Claims, 4 Drawing Sheets

(51) Int. Cl.
*G01B 11/25* (2006.01)
*G06F 17/18* (2006.01)
*G06F 21/32* (2013.01)
*G06N 7/00* (2006.01)

(52) U.S. Cl.
CPC ......... *G06F 21/32* (2013.01); *G06K 9/00201* (2013.01); *G06K 9/2036* (2013.01); *G06N 7/00* (2013.01)

(58) Field of Classification Search
USPC ....... 382/115, 116, 124, 209, 278; 340/5.81, 340/5.82, 5.83
See application file for complete search history.

(56) References Cited

U.S. PATENT DOCUMENTS

| | | | | |
|---|---|---|---|---|
| 6,885,439 B2* | 4/2005 | Fujieda | ................ | G06K 9/0004 356/71 |
| 6,919,959 B2* | 7/2005 | Masten | ............... | A01M 7/0089 356/328 |
| 7,113,621 B2* | 9/2006 | Hosokawa | ......... | G06K 9/00013 283/68 |
| 7,310,434 B2* | 12/2007 | Shigeta | .................. | H04N 5/365 348/E5.081 |
| 7,353,994 B2* | 4/2008 | Farrall | ..................... | G06K 7/12 235/454 |
| 7,366,331 B2* | 4/2008 | Higuchi | ............. | G06K 9/00046 340/5.53 |
| 7,417,731 B1* | 8/2008 | Masten | ............... | A01M 7/0089 356/328 |
| 8,224,064 B1 | 7/2012 | Hassebrook et al. | | |
| 8,724,859 B2* | 5/2014 | Schneider | ............ | G06K 9/0002 382/124 |
| 2009/0208070 A1 | 8/2009 | Fourre et al. | | |
| 2012/0086794 A1* | 4/2012 | Burcham | ............ | G06K 9/00033 348/77 |

OTHER PUBLICATIONS

Li et al; "Comparison of different analytical edge spread function models for MTF calculation using curve-fitting;" MIPPR 2009; Oct. 30, 2009; Remote Sensing and GIS Data Procesing and Other Applications; vol. 7498; No. 74981H.

Chen et al; "3D Touchless Fingerprints: Compatibility with Legacy Rolled Images;" 2006 Biometrics Symposium; Aug. 21, 2006; pp. 1-6.

* cited by examiner

DEVICE FOR CAPTURING IMPRINTS

The invention relates to a device for capturing an image of a imprint of a body part on-the-fly and to a method implemented by this device.

Context of the Invention

The use of fingerprints, for example fingerprints such as a imprint of a finger, of a plurality of fingers or of the palm of a hand, allows access to buildings or machines to be made secure. Security is thus increased in so far as the probability of two people having identical fingerprints is almost zero.

A device for capturing a fingerprint allows an image of a fingerprint to be captured. In the case of an identification, this imprint is compared with a set of reference fingerprints contained in a database. In the case of an authentication, this imprint is compared to a single fingerprint. This comparison allows to determine whether the captured fingerprint does or does not belong to the person referenced in the database or, in other words, whether the person is indeed the person that he is claiming to be.

French patent application FR2927713 describes a device for capturing imprints on-the-fly. This device allows an image of a fingerprint of a body part, such as a finger, a plurality of fingers or the palm of a hand presented to the device to be obtained. This device comprises:
- a source of illumination that acts as a flash, allowing the body part to be illuminated;
- a projector that projects a sight taking the form of a series of light bars onto the body part. The deformation of said sight during its projection onto the body part allows three-dimensional (3D) information on the body part to be obtained. This 3D information is used to flatten and rescale the fingerprint. Once flattened and rescaled, the imprint may be compared to one or more reference imprints; and
- a high-speed camera comprising an image sensor able to capture a clear image of the body part during its passage through the device.

In order to distinguish the sight from the imprint in the image acquired by the imprint-capturing device, the source of illumination and the sight projector employ two separate colours.

Most image sensors comprise photoreceivers that are grouped into groups of four photoreceivers comprising a photoreceiver that is sensitive to red light, a photoreceiver that is sensitive to blue light and two photoreceivers that are sensitive to green light. By allocating one colour to the source of illumination and another to the sight, at most two photoreceivers out of four are used to capture a imprint image. The capacity of the image sensor is therefore not fully utilized since the imprint image obtained possesses a resolution that is at least two times lower than the maximum image resolution of said image sensor.

It would be desirable to mitigate these drawbacks of the prior art. It would in particular be desirable to provide a method and a device in which the capacity of image sensor is fully utilized so as to obtain a imprint image having the maximum resolution permitted by the image sensor.

SUMMARY OF THE INVENTION

According to a first aspect of the invention, the invention relates to a device for capturing an image of a imprint of a body part, comprising an image-acquiring module having an optical field covering an acquisition zone through which the body part may move, a light source that produces a spatially uniform illumination of the body part and a sight-projecting module that projects a luminous sight onto said body part perpendicularly to a direction of movement of the body part. The luminous sight is a repetitive pattern of lower light intensity than the uniform illumination. Said device is able to simultaneously activate the light source, the sight-projecting module and the image-acquiring module in order to allow an image of the imprint, called the acquired image, to be acquired; to model the variations in light intensity of the projection of the sight on the body part by determining parameters of a preset parametric mathematical model; to generate an image of the projection of the sight on the body part, called the synthetic image, on the basis of said model and using the parameters determined beforehand, and to subtract the synthetic image from the acquired image in order to obtain a sight-free image of the body part, said sight-free image of the body part being able to be used to carry out an identification or an authentication.

According to one embodiment, during the modelling, said device is able to scan the acquired image row by row, and to obtain a curve of light intensity in function of pixel number for each row, each curve comprising a plurality of crenels, each crenel being modelled by a function deriving from a logistic function.

According to one embodiment, said device is able to detect each crenel of each row, a crenel being detected in a curve of light intensity when: a first variation in light intensity between a first pixel and a pixel preceding this first pixel in a preset direction in which the row is scanned is positive and higher in absolute value than a first preset threshold; when the first variation in light intensity is followed by a second variation in light intensity between a second pixel and a pixel preceding this second pixel in the preset direction in which the row is scanned, this second variation being negative and higher in absolute value than the first preset threshold; and when the distance in number of pixels between the first variation and the second variation is larger than a second preset threshold.

According to one embodiment, the function deriving from a logistic function is given by:

$$g(x) = \frac{K}{1 + a \cdot e^{-r(x+b-s)}} + \frac{K}{1 + a \cdot e^{+r(x-b-s)}} + d$$

or by $$h(x) = \frac{K}{1 + a \cdot e^{r(x-b-s)}} - \frac{K}{1 + a \cdot e^{+r(x+b-s)}} + d$$

where the parameter K sets a maximum amplitude of a variation, the parameter r sets a slope of the variation, the parameter a sets a form of the variation, the parameter b represents a half-width of a crenel, the parameter d allows a minimum value to be set for the light intensity, and the parameter s sets a position of the crenel on an axis of the pixels.

According to one embodiment, the parameter a and/or the parameter r are preset.

According to one embodiment, following the modelling, said device is able to obtain a list of crenels, each crenel of the list being represented by the parameters of said determined model and by a position of said crenel in the acquired image, and to generate the synthetic image on the basis of each crenel of said list.

According to a second aspect of the invention, the invention relates to an authenticating or identifying method comprising:

obtaining an image, called the acquired image, resulting from simultaneous activation of a light source, of a sight-projecting module and of an image-acquiring module in a device for capturing an image of a imprint of a body part, said image-acquiring module having an optical field covering an acquisition zone through which the body part may move, the light source producing a spatially uniform illumination on the body part and the sight-projecting module projecting a luminous sight onto said body part perpendicularly to a direction of movement of the body part, the luminous sight being a repetitive pattern of lower light intensity than the uniform illumination; modelling the variations in light intensity of the projection of the sight on the body part by determining parameters of a preset parametric mathematical model; generating an image of the projection of the sight on the body part, called the synthetic image, on the basis of said model and using the parameters determined beforehand, and subtracting the synthetic image from the acquired image in order to obtain a sight-free image of the body part, said sight-free image of the body part being able to be used to carry out an identification or an authentication.

According to one embodiment, the method comprises obtaining three-dimensional information on the body part from information on the position of the sight in the acquired image and using said information to generate a final imprint image from the sight-free image of the body part, in which image the imprint is flattened and rescaled to a scale corresponding to a preset scale; and, comparing the final imprint image to at least one reference imprint image in order to carry out the authentication or identification.

According to a third aspect of the invention, the invention relates to a computer program comprising instructions for implementing, with a device, the method according to the second aspect, when said program is executed by a processing unit of said device.

According to a fourth aspect of the invention, the invention relates to storage means storing a computer program comprising instructions for implementing, with a device, the method according to the second aspect, when said program is executed by a processing unit of said device.

BRIEF DESCRIPTION OF THE DRAWINGS

The aforementioned features of the invention, and others, will become more clearly apparent on reading the following description of an example embodiment, said description being given with reference to the appended drawings, in which.

DETAILED DESCRIPTION OF VARIOUS EMBODIMENTS

The following description more particularly details embodiments of the present invention in a context in which the body part is a finger. It however applies to other body parts such as a plurality of fingers, a palm of a hand, etc.

Figure 1A:
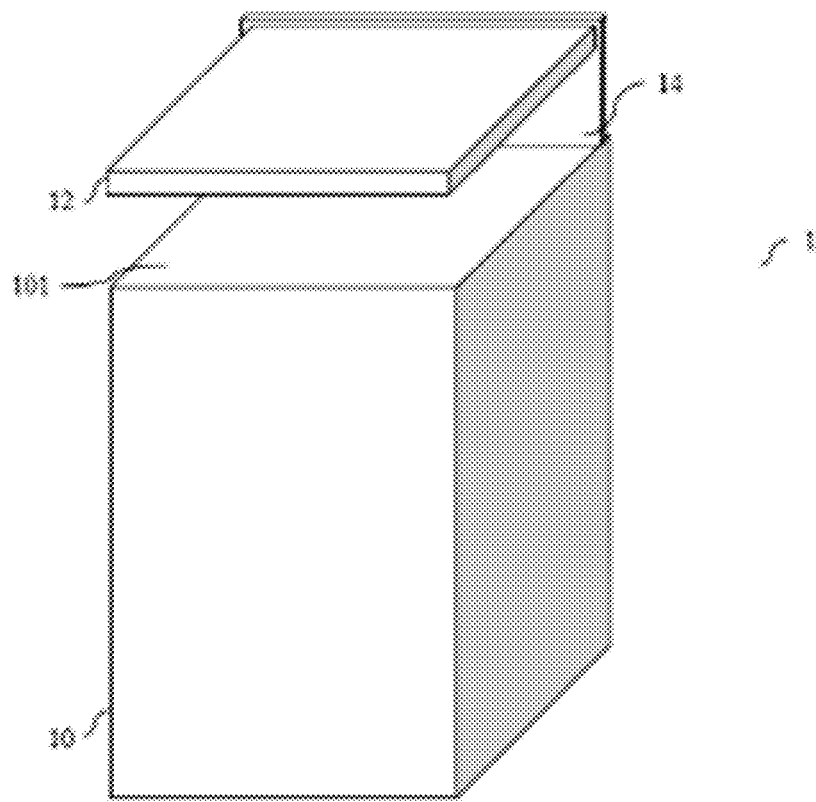
FIG. 1A schematically illustrates a first view of a device for capturing a imprint of a body part according to the invention.
Figure 1B:
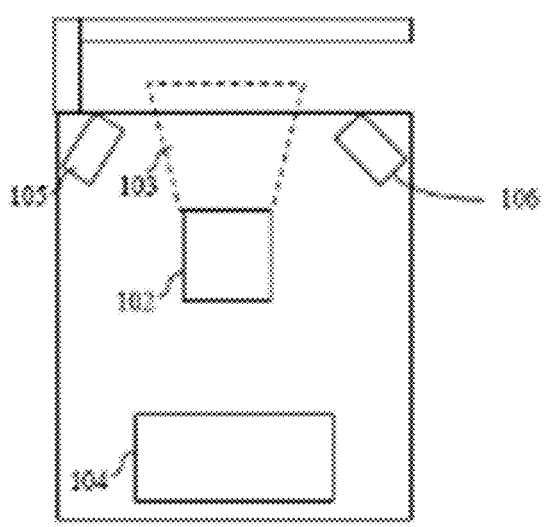
FIG. 1B schematically illustrates a second view of a device for capturing a imprint of a body part according to the invention.

With reference to FIGS. 1 and 2, a device for capturing an image of a imprint of a body part 1, called a biometric device below, according to the invention, comprises a structure including a stand 10 surmounted with a screen 12 that extends parallel to a transparent upper face 101 of the stand 10. The upper face 101 and the screen 12 are separated by a distance of a few centimetres (for example 5 cm for the acquisition of imprints of a finger) in order to define, therebetween, a region of free space 14 that is open, here frontally and laterally on its two sides, in order to form a passage for a finger of the user. The stand 10 encloses an image-acquiring module such as a colour camera 102 that is mounted in the stand 10 in order to have an optical field covering an acquisition zone 103 that is entirely contained in the region of free space 14.

In one embodiment, the lower face of the screen 12 comprises an antireflection coating.

The acquisition zone 103 is here more precisely at the centre of the region of free space 14 and has a plane that is parallel to the upper face 101. The optical field of the camera 102 is wide enough for the acquisition zone 103 to cover the finger of the user (for example an index finger, a middle finger, a ring finger, a little finger, or a thumb). The camera 102 comprises a sensor, such as a charge-coupled device (CCD) or complementary metal-oxide semiconductor (CMOS) sensor having an acquisition speed that is high enough to allow it to take a clear image of a finger moving through the acquisition zone 103 with a preset maximum speed of movement. The sensor used is for example a "1.3" million pixel sensor with a speed comprised between "60" to "100" images per second. The camera 102 is connected to a processing module 104 to which it transmits the colour images. The processing module 104 is described below with reference to FIG. 7.

The structure also comprises a module 105 for projecting a luminous sight 105 and a light source 106. The sight-projecting module 105 and the light source 106 are fastened to the structure below the path of passage of the finger and are directed toward the acquisition zone 103.

The light source 106 acts as a flash and for example comprises at least one light-emitting diode (LED). The light source 106 produces a high-intensity spatially uniform illumination in a wavelength range corresponding, for example, to green light. In another embodiment, the light source 106 emits white light.

The sight-projecting module 105 projects, perpendicularly to the direction of movement of the finger, a sight onto the finger placed in the region of free space 14. The sight comprises a repetitive luminous pattern in the same wavelength range as the light source 106. The repetitive luminous pattern comprises regularly spaced light bars of lower light intensity than the light intensity generated by the light source 106. The light bars are here defined to have an average period, over the finger, of "70" to "80" pixels, at "740" dots per inch (dpi).

In one embodiment, the light source 106 and the sight-projecting module 105 use different wavelength ranges.

Figure 2A:
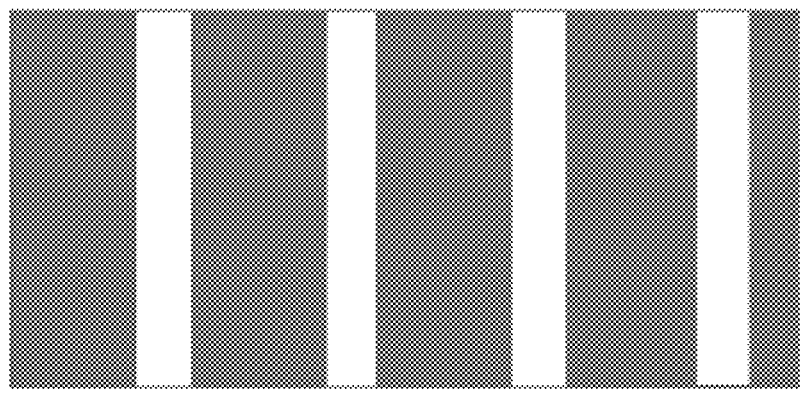
FIG. 2A schematically shows an image acquired by a camera of the device for capturing a imprint of a body part according to the invention during a projection of a sight onto an opaque sheet of paper placed in front of said camera.

FIG. 2A schematically shows an image acquired by the camera 102 of a projection of the sight on an opaque sheet of paper placed in the region of free space 14, parallel to the upper face 101.

In FIG. 2A, the light source 106 is turned off. The sight then appears as an alternation of rectangular luminous zones and dark zones.

Figure 2B:
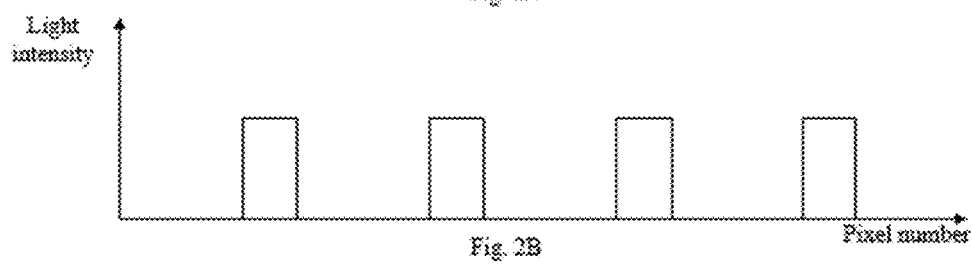
FIG. 2B shows a curve of a light intensity in function of a pixel number, said curve being representative of the light intensity of the pixels of a horizontal row of pixels of the image of the projection of the sight on a sheet of paper.

FIG. 2B shows a curve of a light intensity in function of a pixel number, said curve being representative of the light intensity of the pixels of a horizontal row of pixels of the image of the projection of the sight on a sheet of paper that is shown in FIG. 2A.

This curve comprises a succession of regularly spaced rectangular crenels. Each rectangular crenel may be approximated by a rectangular function. The transition between dark zones and light zones (and vice versa) is here abrupt.

Figure 3A:
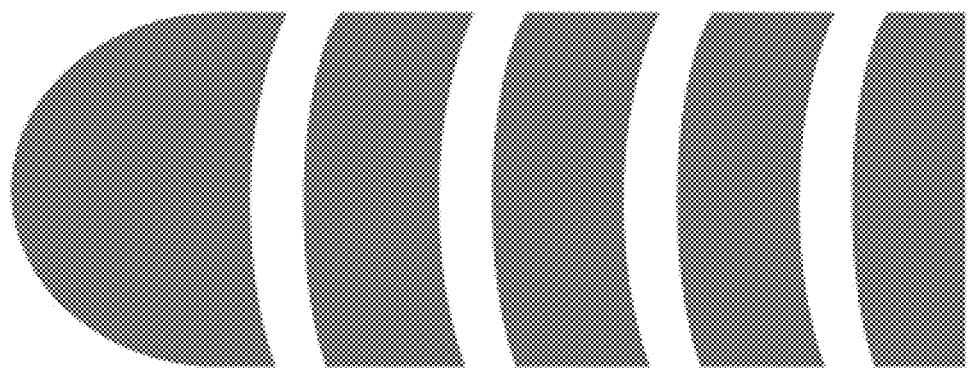
FIG. 3A schematically shows an image acquired by the camera of the device for capturing a imprint of a body part according to the invention of a projection of the sight on a finger placed in front of said camera.

FIG. 3A schematically shows an image acquired by the camera 102 of a projection of the sight on a finger placed in the region of free space 14, parallel to the upper face 101.

In FIG. 3A, the light source 106 is turned off. Since a finger is not a planar surface, but rather of approximately tubular shape, during the projection of the sight onto the finger, the bars appear curved because they closely follow the shape of the finger.

Figure 3B:
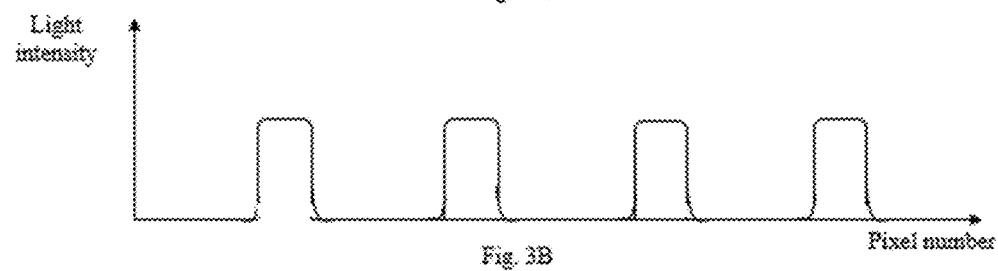
FIG. 3B shows a curve of a light intensity in function of a pixel number, said curve being representative of the light intensity of the pixels of a horizontal row of pixels of the image of the projection of the sight on a finger.

FIG. 3B shows a curve of a light intensity in function of a pixel number, said curve being representative of the light intensity of the pixels of a horizontal row of pixels of the image of the projection of the sight on a finger that is shown in FIG. 3A.

The top portions of the crenels shown in FIG. 3B are rounded and their bottom portions flare outward. In contrast to the sheet of paper, which is a medium that almost does not scatter at all, the finger is a scattering medium. The scattering of light from the finger attenuates the transition between a portion illuminated by the sight and a portion not illuminated by the sight. The transitions between the illuminated portions and the non-illuminated portions in FIG. 3B are more gradual than in FIG. 2B.

Figure 4:
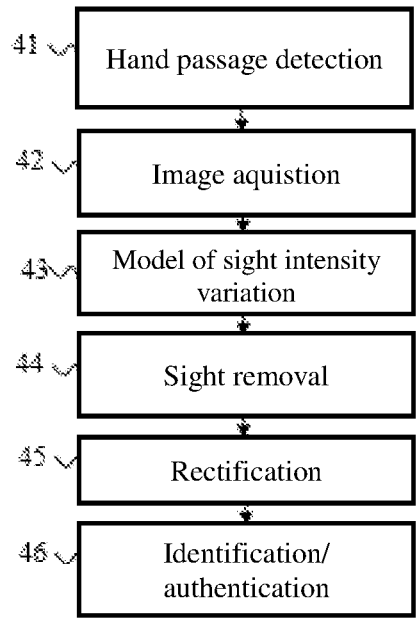
FIG. 4 shows an authenticating or identifying method implemented by the device for capturing a imprint of a body part according to the invention.

FIG. 4 shows an authenticating or identifying method implemented by the biometric device according to the invention.

The user desiring to be identified (or authenticated) places his finger in the region of free space 4 via one side thereof and moves his finger toward the other side.

In a step 41, a sensor of the biometric device 1, here an infrared light curtain (not shown), detects the entrance of the finger into the acquisition zone 103.

In a step 42, the sensor simultaneously activates the sight-projecting module 105, activates the light source 106 and gets the camera 102 to acquire an image that is called the acquired image. The acquired image contains a finger on which a deformed sight appears. The acquired image contains variations in light intensity. First variations in light intensity are due to the bars of the sight and have an average variation frequency. Second light variations are due to optical defects or to defects in the light source 106, which does not illuminate the finger perfectly uniformly. These second variations in light intensity have a variation frequency that is low with respect to the variation frequency due to the bars of the sight. Third light variations are due to the ridges and valleys of the fingerprint of the finger. These third variations in light intensity have a variation frequency that is high with respect to the variation frequency due to the bars of the sight. In one embodiment, the processing module 104 removes, in step 42, the second light variations so that they do not interfere with the following steps of the method. To do this, the processing module 104 equalizes the values of the pixels of the acquired image. For example, the processing module 104 applies a frequency-domain transformation to the acquired image in order to pass this image from the spatial domain to the frequency domain. In the frequency domain, the processing module 104 removes the low spatial frequencies of the transformed acquired image then applies an inverse transformation to the transformed acquired image thus modified.

It will be noted that in one embodiment the sensor of the biometric device 1 may be replaced by a button on which the user presses to simultaneously activate the sight-projecting module 105, the light source 106 and the camera 102 when the finger is in the acquisition zone.

In a step 43, the processing module 104 models the variations in light intensity of the projection of the sight on the finger using a preset parametric mathematical model. In one embodiment, the preset mathematical model is based on a logistic function. A logistic function f(x) is defined in the following way:

$$f(x) = K \frac{1}{1 + a \cdot e^{-rx}}$$

where the variable x is a pixel number in a row, the parameters K and a are real positive numbers and the parameter r is any real number. Logistic functions are particularly suitable for modelling abrupt (almost rectangular) variations in a one-dimensional signal, such as the upward and downward variations of the crenels in FIG. 3B. The parameter K sets a maximum amplitude of the variation, the parameter r sets a slope of the variation and the parameter a sets a form of the variation.

A function g(x) able to model a crenel of FIG. 3B (i.e. able to model a variation in light intensity in function of a pixel number of a horizontal row of the acquired image) may then be obtained by combining two logistic functions in the following way:

$$g(x) = \frac{K}{1 + a \cdot e^{-r(x+b-s)}} + \frac{K}{1 + a \cdot e^{+r(x-b-s)}} + d$$

where the parameter b represents a half-width of a crenel, the parameter d allows a minimum light-intensity value to be set, and the parameter s sets a position of the crenel on the horizontal axis of the pixels.

In one embodiment, a crenel of FIG. 3B may be modelled with a function h(x) that is also obtained by combining two logistic functions:

$$h(x) = \frac{K}{1 + a \cdot e^{r(x-b-s)}} - \frac{K}{1 + a \cdot e^{+r(x+b-s)}} + d$$

The modelling implemented in step 43 then consists in determining the parameters of the preset parametric mathematical model (i.e. for example the parameters a, K, r, b and s of the function g(x) or of the function h(x)) allowing the variations in light intensity due to the sight in the acquired image to the best modelled.

Other functions that are suitable for modelling the crenels of FIG. 3B may be found in the article Comparison of different analytical edge spread function models for MTF calculation using curve-fitting, T. Li, H. Feng, Proc. SPIE 7498, MIPPR 2009: *Remote Sensing and GIS Data Processing and Other Applications,* 74981H (30 Oct. 2009).

Step 43 is detailed below with reference to FIG. 5.

In a step 44, using a method that is described with reference to FIG. 6, the processing module 104 generates an image of the projection of the sight on the finger, called the synthetic image, on the basis of the preset parametric mathematical model and using the parameters determined in step 43, and subtracts the synthetic image from the acquired image in order to obtain a sight-free image of the finger. It would have been possible to find the sight in the acquired image using an image segmentation method for example. However, the obtained image of the sight would have contained noise and the subtraction of this noisy image from the acquired image would have amplified noise already present in the acquired image. Generating a synthetic image on the basis of the preset parametric mathematical model allows an image that contains no (or little) noise to be obtained. Thus, by subtracting the synthetic image from the acquired image, noise already present in the acquired image is not amplified. Thus, the performance of the authenticating and identifying biometric system 1 is improved.

In a step 45, the processing module 104 obtains three-dimensional (3D) information on the body part from information on the position of the sight in the acquired image. The 3D information is used to generate a final imprint image from the sight-free image of the finger, in which image the finger imprint is flattened and rescaled to a preset scale corresponding to a scale of at least one reference imprint image with which the final imprint image is to be compared. The processing module 104 uses, to do this, known scaling and flattening methods, such as the method described in the article "3D Touchless fingerprints compatibility with legacy rolled images", Y. Chen et al., In *Biometric Consortium Conference,* Aug. 21, 2006 Pages: 1-6.

In a step 46, the final imprint image is compared to a reference imprint image for an authentication or to a plurality of reference imprint images for an identification.

Figure 5:
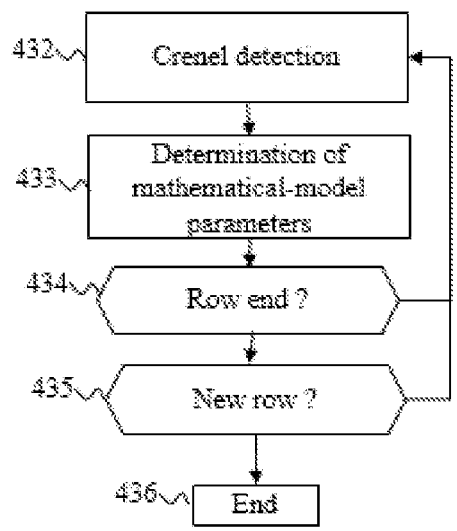
FIG. 5 shows an example of a method for modelling the variations in light intensity of the projection of the sight on a finger using a parametric mathematical model.

FIG. 5 shows an example of a method for modelling the variations in light intensity of the projection of the sight on a finger using a preset parametric mathematical model.

The method described in FIG. 5 details step 43.

During the implementation of the method described in FIG. 5, the processing module 104 scans the acquired image row by row from top to bottom. The finger is assumed to be horizontal in the acquired image, such as schematically shown in FIG. 3A.

In a step 432, the processing module 104 scans the first row of the acquired image, for example from left to right, until a crenel is detected. A crenel is detected in a row of pixels during scanning when a first variation in light intensity between a first pixel and a pixel preceding this first pixel in a direction in which the row is scanned is positive and higher in absolute value than a first preset threshold;

when the first variation in light intensity is followed by a second variation in light intensity between a second pixel and a pixel preceding this second pixel in the direction in which the row is scanned, this second variation being negative and higher in absolute value than the first preset threshold;

and when the distance in number of pixels between the first variation and the second variation is larger than a second preset threshold.

The distance between the first (the second, respectively) pixel and the preceding pixel is a preset distance (measured in pixels).

The first and second thresholds and the preset distance are determined from a vast sample group of acquired images obtained using the biometric device 1.

In step 432, crenel location information, such as the position of the current crenel in the row (pixel number of the start of the crenel and pixel number of the end of the crenel) and the number of the row being scanned are saved in memory in the processing module 104.

In a step 433, the processing module 104 determines preset-parametric-mathematical-model parameters that fit the crenel detected in step 432. When the preset parametric mathematical model corresponds to the function g(x) (to the function h(x), respectively), the processing module 104 searches for parameters K, a, r, b and s such that the function g(x) (the function h(x), respectively) follows as best as possible the shape of the crenel detected in step 432. In one embodiment, the processing module 104 varies the parameters K, a, r, b and s until a set of parameters that minimizes a difference between a crenel given by the function g(x) (by the function h(x), respectively) and the crenel detected in step 432 has been found. Said parameters may for example be determined using a gradient descent method or a least squares method.

In one embodiment, the parameter a is set to unity (a=1).

In one embodiment, the parameter r, which is relatively constant from one finger to the next, is preset using a vast sample group of acquired images obtained using the biometric device 1. Since the parameter r is greatly influenced by high spatial frequencies (typically the spatial frequencies due to the peaks and troughs), it is advantageous to set this parameter so that the determination of the other parameters of the module is not disrupted by said high spatial frequencies. The parameters K, a, r, b and s thus determined are stored in memory in the processing module 104 with the crenel location information.

Once the processing of the crenel has ended, the processing module 104 determines, in a step 434, whether the entire row has been scanned and, if this is not the case, returns to step 432 in order to begin once again to search for a new crenel or finish scanning the row.

If the entire row has been scanned, the processing module 104 determines, in a step 435, whether another row must be examined. If this is the case, the processing module returns to step 432 and begins to search for a crenel in a new row.

Otherwise, the processing module 104 ends the method of FIG. 5 in a step 436. At the end of the method described with reference to FIG. 5, a list of crenels of the acquired image is obtained, each crenel being represented by the parameters K, a, r, b and s of the preset parametric mathematical model and the location information.

Figure 6:
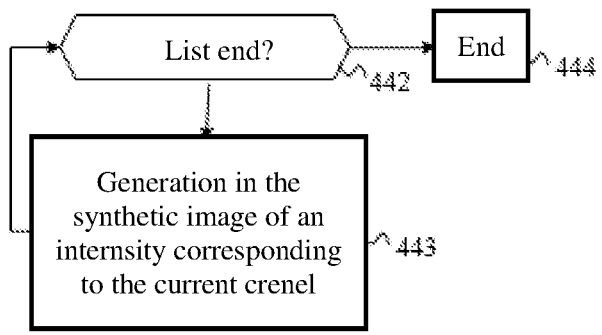
FIG. 6 shows an example of a method for generating a synthetic image according to the invention.

FIG. 6 shows an example of a method for generating a synthetic image according to the invention.

On the basis of the list of crenels obtained in step 43, the processing module 104 generates a synthetic image containing the projection of the sight on the finger.

In a step 442, the processing module determines whether it has scanned the entire list of crenels. If the entire list of crenels has been scanned, the method ends. The synthetic image has then been generated.

Otherwise, in a step 443, the processing module 104 obtains the position of a current crenel in the acquired image and generates light intensities on the basis of the parametric mathematical model at said position. Following step 443, the processing module 104 returns to step 442, and if the list of crenels has not been integrally scanned, returns to step 443 for a new crenel.

In one embodiment, when the acquired image is a multi-component image containing a plurality of components, such as one luminance component and two chrominance components, the synthetic image is also a multi-component image. In this case, the methods of FIGS. 5 and 6 are applied to each component, one by one. Each of the components of the synthetic image is subtracted from the corresponding component of the acquired image, one by one.

Figure 7:
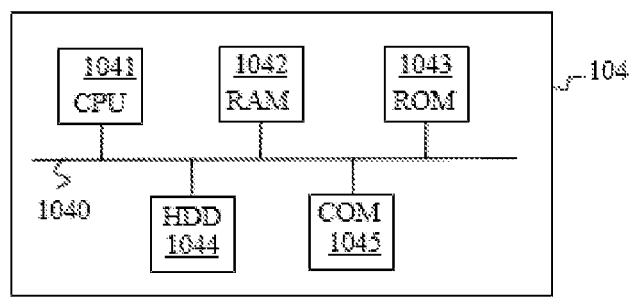
FIG. 7 schematically illustrates an example hardware architecture for the processing module comprised in the device for capturing a imprint of a body part according to the invention.

FIG. 7 schematically illustrates an example hardware architecture for the processing module 11.

In the example hardware architecture shown in FIG. 7, the processing module 104 thus comprises, connected by a communication bus 1040: a processor or central processing unit (CPU) 1041; a random-access memory (RAM) 1042; a read-only memory (ROM) 1043; a storage unit 1044 such as a hard disk, or a storage-medium reader such as a secure-digital (SD) card reader; at least one communication interface 1045 allowing, for example, the processing module 104 to communicate with the camera 102, the light source 106 and the sight-projecting module 105.

The processor 1041 is capable of executing instructions loaded into the RAM 1042 from the ROM 1043, from an external memory (not shown), from a storage medium (such as an SD card), or from a communication network. When the processing module 104 is turned on, the processor 1041 is capable of reading, from the RAM 1042, instructions and of executing them. These instructions form a computer program that causes the method described with reference to FIG. 4 to be implemented by the processor 1041.

The method described with reference to FIG. 4 may be implemented in software form via execution of a set of instructions by a programmable machine (for example a digital signal processor (DSP), a microcontroller or a graphics processing unit (GPU)), or be implemented in hardware form via a machine or dedicated component (for example a field-programmable gate array (FPGA) or an application-specific integrated circuit (ASIC)).

The invention claimed is:

1. A device for capturing an image of a imprint of a body part, comprising
an image-acquiring module having an optical field covering an acquisition zone through which the body part may move,
a light source that produces a spatially uniform illumination of the body part and
a sight-projecting module that projects a luminous sight onto said body part perpendicularly to a direction of movement of the body part, wherein:
the luminous sight is a repetitive pattern of lower light intensity than the uniform illumination; and
said device comprises circuitry adapted to:
simultaneously activate the light source, the sight-projecting module and the image-acquiring module in order to allow an image of the imprint, called the acquired image, to be acquired;
model the variations in light intensity of the projection of the sight on the body part by determining parameters of a preset parametric mathematical model;
generate an image of the projection of the sight on the body part, called the synthetic image, on the basis of said model and using the parameters determined beforehand, and to subtract the synthetic image from the acquired image in order to obtain a sight-free image of the body part, said sight-free image of the body part being able to be used to carry out an identification or an authentication.

2. The device according to claim 1, wherein, during the modelling, said device is able to scan the acquired image row by row, and to obtain a curve of light intensity in function of pixel number for each row, each curve comprising a plurality of crenels, each crenel being modelled by a function deriving from a logistic function.

3. The device according to claim 2, wherein said device is able to detect each crenel of each row, a crenel being detected in a curve of light intensity when: a first variation in light intensity between a first pixel and a pixel preceding this first pixel in a preset direction in which the row is scanned is positive and higher in absolute value than a first preset threshold; when the first variation in light intensity is followed by a second variation in light intensity between a second pixel and a pixel preceding this second pixel in the preset direction in which the row is scanned, this second variation being negative and higher in absolute value than the first preset threshold; and when the distance in number of pixels between the first variation and the second variation is larger than a second preset threshold.

4. The device according to claim 2, wherein the function deriving from a logistic function is given by:

$$g(x) = \frac{K}{1 + a \cdot e^{-r(x+b-s)}} + \frac{K}{1 + a \cdot e^{+r(x-b-s)}} + d$$

or by $$h(x) = \frac{K}{1 + a \cdot e^{r(x-b-s)}} - \frac{K}{1 + a \cdot e^{+r(x+b-s)}} + d$$

where the parameter K sets a maximum amplitude of a variation, the parameter r sets a slope of the variation, the parameter a sets a form of the variation, the parameter b represents a half-width of a crenel, the parameter d allows a minimum value to be set for the light intensity, and the parameter s sets a position of the crenel on an axis of the pixels.

5. The device according to claim 4, wherein the parameter a and/or the parameter r are preset.

6. The device according to claim 2, wherein, following the modelling, said device is able to obtain a list of crenels, each crenel of the list being represented by the determined parameters of said model and by a position of said crenel in the acquired image, and to generate the synthetic image on the basis of each crenel of said list.

7. An authenticating or identifying method, comprising:
obtaining an image, called the acquired image, resulting from simultaneous activation of a light source, of a sight-projecting module and of an image-acquiring module in a device for capturing an image of a imprint of a body part, said image-acquiring module having an optical field covering an acquisition zone through which the body part may move, the light source producing a spatially uniform illumination on the body part and the sight-projecting module projecting a luminous sight onto said body part perpendicularly to a direction of movement of the body part, the luminous sight being a repetitive pattern of lower light intensity than the uniform illumination;

modelling the variations in light intensity of the projection of the sight on the body part by determining parameters of a preset parametric mathematical model;

generating an image of the projection of the sight on the body part, called the synthetic image, on the basis of said model and using the parameters determined beforehand, and subtracting the synthetic image from the acquired image in order to obtain a sight-free image of the body part, said sight-free image of the body part being able to be used to carry out an identification or an authentication.

8. The method according to claim 7, comprising:

obtaining three-dimensional information on the body part from information on the position of the sight in the acquired image and using said information to generate a final imprint image from the sight-free image of the body part, in which image the imprint is flattened and rescaled to a scale corresponding to a preset scale; and, comparing the final imprint image to at least one reference imprint image in order to carry out the authentication or identification.

9. A computer program product embodied in a non-transitory computer readable medium and comprising instructions for implementing, with a device, the method according to claim 7, when said computer program product is executed by a processing unit of said device.

10. A non-transitory storage medium, storing a computer program comprising program code instructions which can be loaded in a programmable device to cause said programmable device to implement the method according to claim 7, when said program is executed by a processing unit of said programmable device.

11. The method according to claim 7, wherein modelling comprises scanning the acquired image row by row, and obtaining a curve of light intensity in function of pixel number for each row, each curve comprising a plurality of crenels, each crenel being modelled by a function deriving from a logistic function.

* * * * *